United States Patent [19]
Gilabert et al.

[11] Patent Number: 6,096,452
[45] Date of Patent: Aug. 1, 2000

[54] RETAINING DEVICE FOR ONE-PIECE BATTERY

[75] Inventors: Claude Gilabert, Le Plan Medoc; Michel Leturque, Blanquefort; Roclof Verhoog, Bordeaux, all of France

[73] Assignee: Alcatel, Paris, France

[21] Appl. No.: 09/122,797

[22] Filed: Jul. 27, 1998

[30] Foreign Application Priority Data

Jun. 29, 1998 [FR] France ................................... 98 08205

[51] Int. Cl.⁷ ....................................................... H01M 2/10
[52] U.S. Cl. ........................... 429/151; 429/153; 429/163
[58] Field of Search .................................... 429/151, 153, 429/163, 167, 176, 178

[56] References Cited

U.S. PATENT DOCUMENTS

| | | | |
|---|---|---|---|
| 4,345,009 | 8/1982 | Fahle et al. | 429/37 |
| 5,789,091 | 8/1998 | Wozniczka et al. | 429/12 |

FOREIGN PATENT DOCUMENTS

| | | |
|---|---|---|
| 645735 | 7/1964 | Belgium . |
| 0 065 349 A1 | 11/1982 | European Pat. Off. . |
| 92 10 668 | 2/1993 | Germany . |
| 55-143775 | 11/1980 | Japan . |
| 61-126764 | 6/1986 | Japan . |
| 10125349 | 5/1998 | Japan . |

*Primary Examiner*—Maria Nuzzolillo
*Assistant Examiner*—Monique Wills
*Attorney, Agent, or Firm*—Sughrue, Mion, Zinn, Macpeak & Seas, PLLC

[57] ABSTRACT

The present invention consists of a device for retaining a one-piece battery with a prismatic casing having two longitudinal walls and two transverse walls. The device contains two plates applied to respective transverse walls and at least one cinching mechanism for the plates consisting of at least one flat strip closed on itself surrounding the longitudinal walls and the transverse walls are provided with the plates. The device is characterized in that at least one of the plates contains at least one recessed housing and the strip closely follows the shape of the housing.

13 Claims, 3 Drawing Sheets

RETAINING DEVICE FOR ONE-PIECE BATTERY

BACKGROUND OF THE INVENTION

1. Field of the Invention

The present invention relates to a retaining device for a one-piece battery. Such batteries are used to power electric vehicles. The capacity of a nickel-cadmium or nickel-hydridable metal one-piece battery is in the range 5 Ah to 250 Ah.

2. Description of the Related Art

In a one-piece battery, the plate groups are contained in compartments in a single casing. The casing is usually made of a plastics material and prismatic in shape. Each plate group is constituted by an assembly of alternate positive and negative planar electrodes separated from each other by a separator and impregnated with an electrolyte. The plate group has two small faces corresponding to the edges of the stacked electrodes and two large faces parallel to the electrode surface. The longitudinal walls of the battery correspond to the small faces of the group and the transverse walls correspond to the large faces of the group.

During cycling, the electrodes undergo dimensional variations which exert a thrust on the casing walls opposite the large faces of the group. Further, the internal gas pressure bears on all of the casing walls. In order to prevent the battery from expanding and deforming, a device must be provided which will retain the walls.

U.S. Pat. No. 4,020,244 describes a battery composed of a plurality of sealed parallelepipedal rechargeable cells, in particular nickel-cadmium type cells, provided with a device intended to prevent the battery from deforming. The fixing system comprises a pair of compression plates at the ends of the stack of cells and a plurality of bands passing around the stack and the plates. The bands are cinched tight and their ends are welded together.

The inevitable release of heat caused by welding necessitates the presence of heatsinks. When the welding is carried out at the ends of the battery, the mass of the plates may be sufficient to fulfil this role; however, if the welding is carried out on one of the sides, heatsinks must be added to protect the rechargeable cells.

Patent FR-1 267 153 describes a battery made up of a plurality of rechargeable cells. The groups are contained in boxes which are juxtaposed and connected by belts associated with the plates. The device includes plate groups perpendicular to their plane. The belts are closed up on themselves by tensioning devices to make it possible to release the belt if it is necessary to remove or introduce a box.

For a one-piece battery, the problem of replacing a box does not arise. A tensioning device would unnecessarily increase the bulk and cost of the battery.

SUMMARY OF THE INVENTION

The present invention aims to provide a device for retaining a one-piece battery which is less bulky, easier to implement and cheaper than known devices.

The present invention provides a device for retaining a one-piece battery with a prismatic casing having two longitudinal walls and two transverse walls. The device comprises two plates respectively pressed against each of the transverse walls and at least one cinching means for the plates consisting of at least one flat strip closed on itself surrounding the longitudinal walls and the transverse walls provided with the plates.

The device of the invention is characterized in that at least one of the plates comprises at least one recessed housing and in that a portion of the length of the strip penetrates into the housing in order to tension the strip.

The deformation of the strip which is necessary to make it enter the housing uses up a portion of the length of the strip. The strip then fits closely against the end plates and the longitudinal walls of the container. The cinching force applied by the strip after deformation depends on the length of the strip and on the portion of this length used for the deformation.

In order to take on and keep the shape conferred on it, the strip must be semi-rigid. The strip is preferably cut from a metal sheet.

The thickness and width of the strip depends on the thrust to be contained. In a first embodiment, the strip is a steel strip which is protected against corrosion, for example by a coating of nickel or another metal, and has a thickness of over 0.2 mm.

In a preferred embodiment of the invention the cinching means comprises two 1 mm thick stainless steel strips 22 mm wide giving a cross-section of 44 $mm^2$.

In a second embodiment of the invention the cinching means comprises two 0.3 mm thick strips 132 mm wide giving a cross-section of 40 $mm^2$.

In a second implementation, the strip is of stainless steel and is at least 0.6 mm thick, preferably having a thickness in the range 0.8 mm to 1.2 mm, when the large face of the group has a surface area of the order of 1.5 $dm^2$. In the same case an aluminum strip would be thicker than a stainless steel strip.

Advantageously, the depth of said housing is of the same order as the thickness of the strip. In this case, deformation of the strip is practically irreversible.

The housing is preferably provided on the section of said plate aligned with said longitudinal wall. The plate is then used as a die for the press tool.

Advantageously, said longitudinal walls have grooves the width and thickness of said strip over their entire length. The grooves act to guide the strip and absorb any extra thickness resulting from its presence. The batteries can then be coupled together without loss of space.

Advantageously, said plates have grooves the width and thickness of the strip on their outer face. The transverse walls of the batteries can thus also be juxtaposed without loss of space.

The plates are placed against the transverse walls of the battery and immobilized in translation in a plane parallel to the electrodes. As an example, housings for the plates can be made in the transverse wall.

Advantageously, the transverse wall is concave in shape and the face of said plate turned towards said casing closely follows the shape of said transverse wall. This shape enables the transverse wall to resist the thrust of the electrodes, the thickness of which varies during cycling.

The invention also relates to a process for producing the retaining device comprising the following steps.

Firstly, a respective plate is applied to each of the transverse walls.

Then a flat strip is cut and closed upon itself so that the length of the closed strip is slightly greater than the perimeter of the casing between the plates. This provides sufficient clearance for positioning the strip.

The closed strip is then placed around the longitudinal walls and the plates on the outer periphery of the battery.

Finally, thrust is exerted on the strip to cause it to penetrate into the housing, shortening the strip to cinch the plates against the battery casing. An appropriate tool is used to exert a limited force on the strip without causing it to deform. When the thrusting force of the tool on the strip is reached, the force is removed and the strip is tensioned. If the excess length of the strip is sufficient, it will closely follow the shape of the housing.

The strip is preferably deformed by compression, in particular using a press tool.

BRIEF DESCRIPTION OF THE DRAWINGS

The invention will be better understood and other advantages and features will become apparent from the following description which is given by way of non limiting illustration and with reference to the accompanying drawings, in which:

FIGS. 3 and 4 are an enlargement of zone IV showing the method of producing the embodiment of FIG. 2, wherein FIG. 3 represents the belt before pressing and FIG. 4, analogous to FIG. 3, represents the belt after pressing;

DESCRIPTION OF THE PREFERRED EMBODIMENTS

Figure 1:
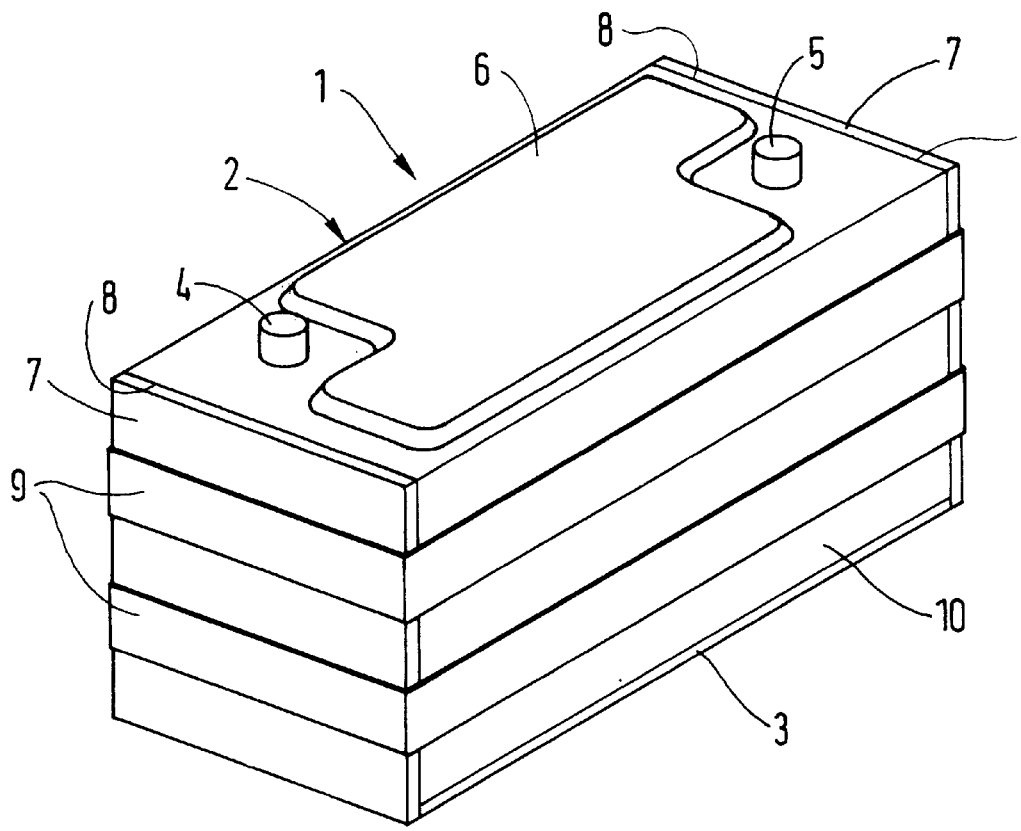
FIG. 1 is a perspective view of a one-piece battery including a retaining device according to the present invention.

FIG. 1 shows a one-piece nickel-hydridable metal (Ni-MH) battery 1 in accordance with the present invention with a capacity of about 100 Ah. The battery includes a thermoplastics polymer casing 2 of prismatic shape and closing means for the casing constituting a base 3. The upper portion of the casing 2 carries a positive terminal 4 and a negative terminal 5 for electrically connecting the battery to an external connection and a lid 6 protecting the electrical connections between the plate groups.

Plates 7 in contact with transverse walls 8 of the casing are disposed at each end of the casing. Plates 7 are held in place by two flat metallic belts 9 consisting of two nickel plated steel strips 0.3 mm thick and 132 mm wide. Belts 9 are applied along the length of the longitudinal walls 10 and passing over plates 7.

Figure 2:
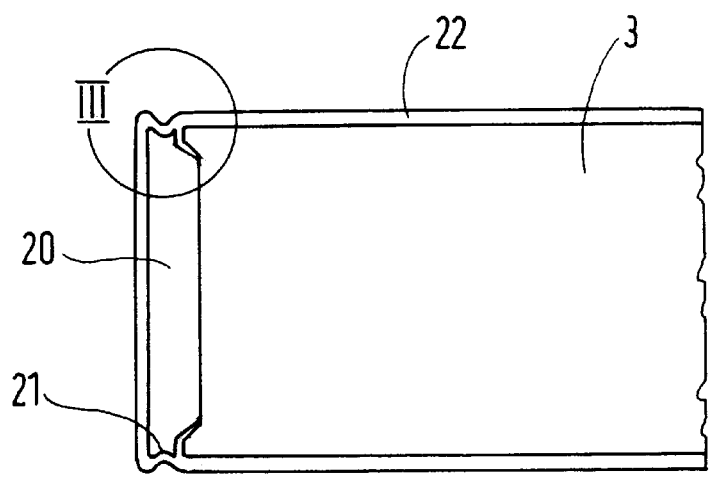
FIG. 2 is a partial bottom view of the battery showing one embodiment of the device of the present invention.
Figure 3:
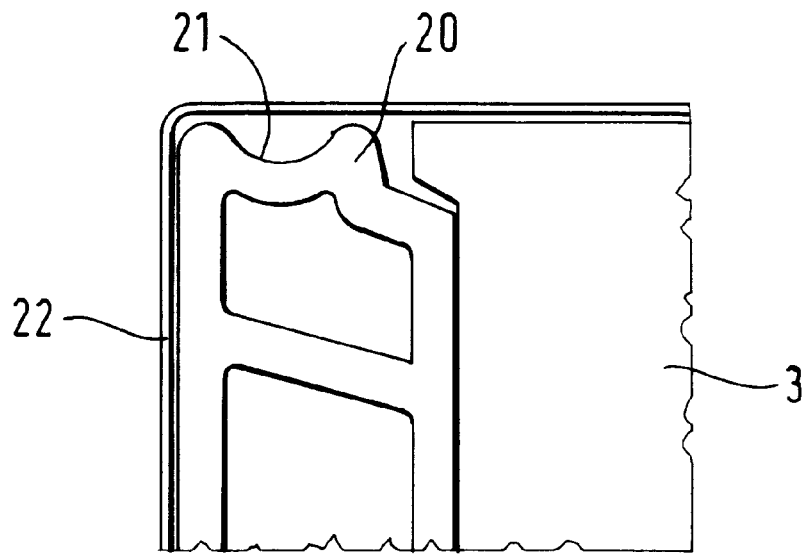
Figure 4:
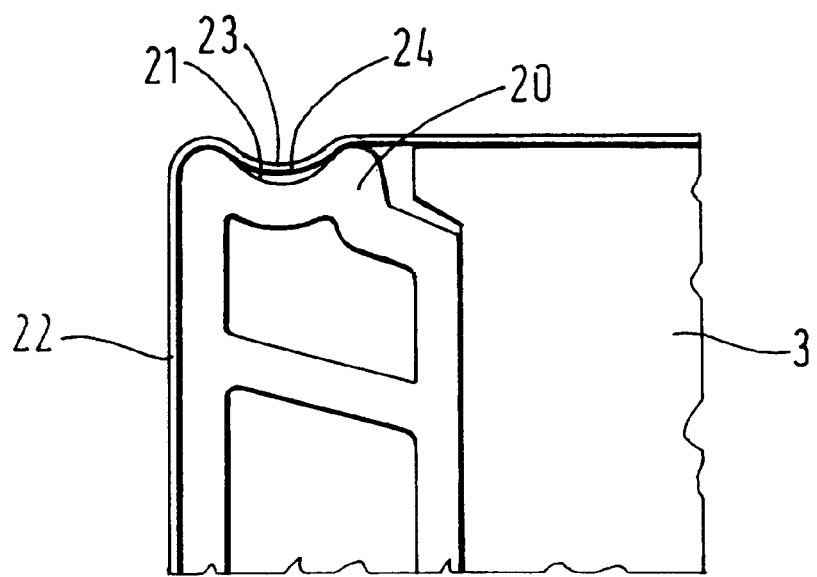

As shown in FIG. 2, plate section 20 carries a housing 21 forming a recess. A metal strip is cut and closed on itself by welding its ends to form a belt 22 with a length which is slightly greater than the perimeter of the casing provided with plates 20 to allow sufficient clearance for positioning the belt. Belt 22 is then placed around the one-piece battery provided with plates 20. A force is then exerted on belt 22 in the direction of the arrow shown in FIG. 3 to cause it to deform at 23. The deformed portion 24 of belt 22 closely follows the shape of housing 21 as shown in FIG. 4, thus causing belt 22 to cinch onto longitudinal walls 10 of casing 2 and plates 20. Belt 22 is under tension and holds casing 2 and plates 20 together. No clearance is envisaged between the plate group and transverse walls 8 of casing 2; thus the thrust exerted by bulging of the group is completely taken up by plates 20 and not by casing 2, which might otherwise rupture.

Figure 5:
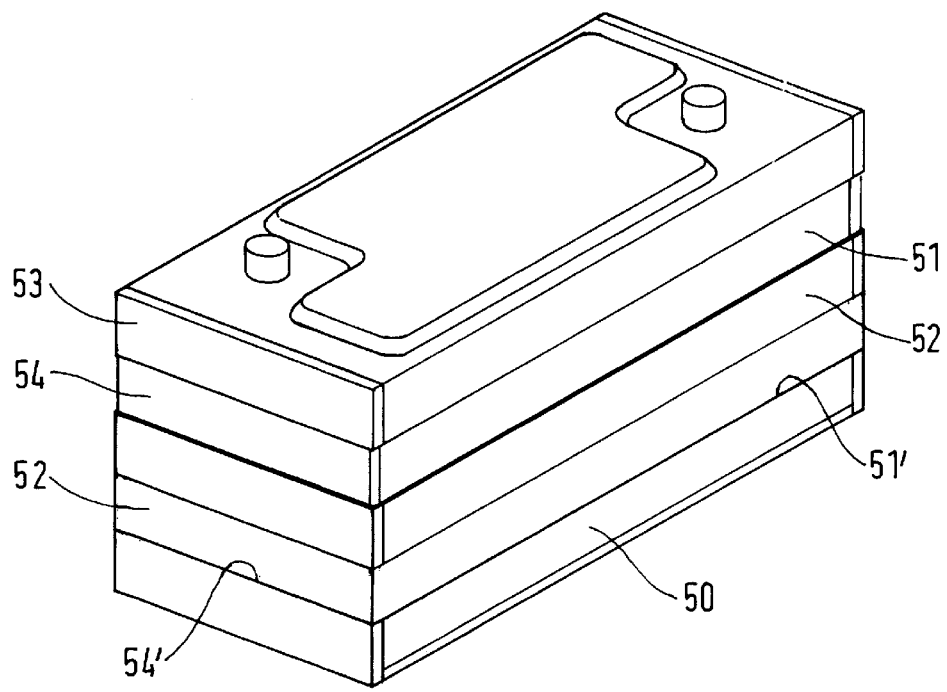
FIG. 5 is a perspective view of a one-piece battery showing another development of the present invention.

FIG. 5 shows another embodiment of the invention in which the one-piece battery comprises two grooves 51, 51' over the entire length of the longitudinal wall 50. The upper groove 51 and a nickel-plated steel belt 52 1 mm thick and 22 mm wide in groove 51' are shown. Groove 51' is about the same width as belt 52 and its depth is of the same order as the thickness of belt 52. Preferably, groove 51, 51' extends over plate 53 via a groove 54, 54' of substantially the same dimensions. This groove, which houses the belt, means that the retaining device does not increase the bulk of the battery.

Figure 6:
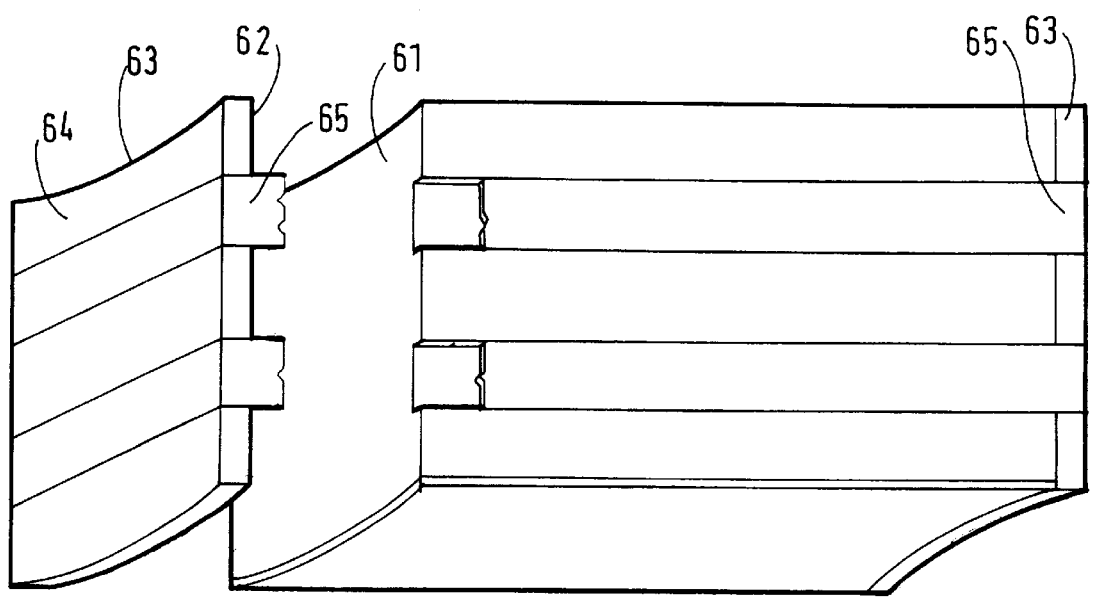
FIG. 6 is a perspective view of a one-piece battery showing a further development of the present invention.

In another embodiment, shown in FIG. 6, the thrust of the electrodes on the transverse walls 61 of the casing is compensated by giving these walls 61 a concave shape. Thus, transverse wall 61 bend toward a planar shape when pushed out by the electrodes. Face 62 of plates 63 applied against transverse wall 61 has a convex profile closely following the concavity of wall 61. Advantageously, the opposed face 64 has a profile parallel to that of face 62.

What is claimed is:

1. A device for retaining a one-piece battery with a casing having two longitudinal walls and two transverse walls, said device comprising two plates respectively disposed against said transverse walls and at least one cinching means for securing said plates to said casing said cinching means including at least one flat strip closed on itself surrounding said longitudinal walls and said transverse walls provided with said plates, wherein at least one of said plates has at least one recess and in that a portion of the length of said strip penetrates into said recess in order to tension said strip.

2. A device according to claim 1 wherein said strip is metallic.

3. A device according to claim 1 wherein said strip is steel and is over 0.2 mm thick.

4. A device according to claim 1 wherein said cinching means comprises two steel strips 1 mm thick and 22 mm wide.

5. A device according to claim 1 wherein said cinching means comprises two steel strips 0.3 mm thick and 132 mm wide.

6. A device according to claim 1 wherein said strip is of stainless steel and is at least 0.6 mm thick.

7. A device according to claim 1 wherein the depth of said recess is of the same order as the thickness of said strip.

8. A device according to claim 1 wherein said recess is provided in a section of said plate aligned with said longitudinal wall.

9. A device according to claim 1 wherein said longitudinal walls have grooves equal to the width and thickness of said strip over their entire length.

10. A device according to claim 1 wherein said plates have grooves equal to the width and thickness of said strip on their outer face.

11. A device according to claim 1 wherein said transverse wall is concave in shape and the face of said plate towards said casing closely follows the shape of said transverse wall.

12. A process for producing a retaining device according to claim 1 comprising the steps of:

applying a respective plate to each of said transverse walls;

cutting a flat strip and closing said strip on itself;

disposing said closed strip around said longitudinal walls and said plates; and deforming said strip to cause it to penetrate into said recess.

13. A process for producing a retaining device according to claim 8 wherein said strip is deformed by compression.

* * * * *